United States Patent
May

(10) Patent No.: US 9,901,827 B2
(45) Date of Patent: Feb. 27, 2018

(54) METHODS AND SYSTEM RELATING TO PHYSICAL CONSTRUCTIONS AND VIRTUAL REPRESENTATIONS

(71) Applicant: SPIN MASTER LTD., Toronto (CA)

(72) Inventor: Timothy Robert May, Beverly Hills, CA (US)

(73) Assignee: SPIN MASTER LTD., Toronto (CA)

( * ) Notice: Subject to any disclaimer, the term of this patent is extended or adjusted under 35 U.S.C. 154(b) by 93 days.

(21) Appl. No.: 14/988,836

(22) Filed: Jan. 6, 2016

(65) Prior Publication Data
US 2016/0193537 A1 Jul. 7, 2016

Related U.S. Application Data

(60) Provisional application No. 62/100,411, filed on Jan. 6, 2015.

(51) Int. Cl.
| | |
|---|---|
| *G06F 17/00* | (2006.01) |
| *A63F 13/63* | (2014.01) |
| *A63F 13/213* | (2014.01) |
| *A63H 33/04* | (2006.01) |
| *A63H 33/08* | (2006.01) |

(Continued)

(52) U.S. Cl.
CPC ............ *A63F 13/63* (2014.09); *A63F 13/213* (2014.09); *A63F 13/335* (2014.09); *A63F 13/69* (2014.09); *A63F 13/95* (2014.09); *A63H 33/042* (2013.01); *A63H 33/086* (2013.01)

(58) Field of Classification Search
USPC ..................................................... 463/30–33
See application file for complete search history.

(56) References Cited

U.S. PATENT DOCUMENTS

| | | | |
|---|---|---|---|
| 6,290,565 B1 | 9/2001 | Galyean, III et al. | |
| 7,488,731 B2 * | 2/2009 | Dhanoa ................ | C07D 211/96 514/255.03 |

(Continued)

FOREIGN PATENT DOCUMENTS

WO    2014100230 A1    6/2014

OTHER PUBLICATIONS

U.S. Appl. No. 14/581,925, Non-Final Office Action, dated Feb. 27, 2017, US Patent Office.

*Primary Examiner* — Ronald Laneau
(74) *Attorney, Agent, or Firm* — Millman IP Inc.

(57) ABSTRACT

In an aspect, a system for game play is provided, comprising a plurality of toy construction elements and a computer system. At least some of the toy construction elements include a first connector and a second connector. The computer system receives identification data relating to physical constructions made from at least two of the construction elements. For a first physical construction made from a first plurality of toy construction elements, the system generates a virtual representation of a first character, and generates a first set of properties for the virtual representation of the first character. For a second physical construction made from a second, larger, plurality of toy construction elements, the system generates a virtual representation of a second character based, and generates a second set of properties for the virtual representation of the second character. The system receives commands to operate the generated virtual representation in a virtual environment.

9 Claims, 5 Drawing Sheets

(51) Int. Cl.
*A63F 13/69* (2014.01)
*A63F 13/335* (2014.01)
*A63F 13/95* (2014.01)

(56) References Cited

U.S. PATENT DOCUMENTS

| | | |
|---|---|---|
| 7,843,471 B2 | 11/2010 | Doan et al. |
| 7,862,428 B2 | 1/2011 | Borge |
| 8,157,611 B2 | 4/2012 | Zheng |
| 8,205,158 B2 | 6/2012 | Ganz et al. |
| 8,353,767 B1 | 1/2013 | Borst et al. |
| 8,469,766 B2 | 6/2013 | Zheng |
| 8,549,416 B2 | 10/2013 | Ganz et al. |
| 8,692,835 B2 | 4/2014 | Hamilton, II et al. |
| 8,777,687 B2 | 7/2014 | Ganz |
| 8,858,339 B2 | 10/2014 | Reiche et al. |
| 8,864,589 B2 | 10/2014 | Reiche, III |
| 9,480,929 B2 * | 11/2016 | Weston ............... A63H 3/36 |
| 9,604,135 B2 * | 3/2017 | Leyland ............... A63F 13/23 |
| 2003/0156134 A1 | 8/2003 | Kim |
| 2004/0198158 A1 * | 10/2004 | Driscoll ............... A63H 3/28 446/297 |
| 2008/0163055 A1 | 7/2008 | Ganz et al. |
| 2010/0083148 A1 | 4/2010 | Finn et al. |
| 2011/0098092 A1 | 4/2011 | Reiche, III |
| 2012/0016764 A1 | 1/2012 | Ouimet |
| 2012/0208638 A1 | 8/2012 | Barney et al. |
| 2012/0295703 A1 | 11/2012 | Reiche et al. |
| 2012/0295704 A1 | 11/2012 | Reiche et al. |
| 2013/0005438 A1 | 1/2013 | Ocko |
| 2013/0317953 A1 | 11/2013 | Ganz et al. |
| 2014/0011596 A1 | 1/2014 | Ganz |
| 2014/0274373 A1 | 9/2014 | Olshan et al. |
| 2016/0125456 A1 | 5/2016 | Wu et al. |

\* cited by examiner

METHODS AND SYSTEM RELATING TO PHYSICAL CONSTRUCTIONS AND VIRTUAL REPRESENTATIONS

CROSS-REFERENCE TO RELATED APPLICATIONS

This application claims priority to U.S. Provisional Patent Application No. 62/100,411 filed Jan. 6, 2015, the contents of which are incorporated herein in their entirety.

FIELD

The specification relates generally to physical constructions and computer generated virtual representations of the physical constructions in a virtual environment.

BACKGROUND OF THE DISCLOSURE

Some game systems have been marketed wherein a user can combine a top half of a physical action figure with a bottom half of another action figure in order to create a hybrid action figure. The hybrid action figure can be uploaded to a computer and a virtual character can be generated, which the user can control in a virtual environment. A problem, however, is that there are only very limited ways of combining parts of different characters. As a result, in order to get much variety in the types of virtual characters that can be generated, a company must sell many different action figures. For example, if the company wishes to sell 10 different action figures, wherein any top half of each action figure can be combined with any bottom half, a total 100 different virtual characters can be generated. It would be beneficial to be able to generate a greater number of virtual characters from a selected number of action figures.

Additionally, it would generally desirable to be able to provide virtual products that are variable and configurable, as the virtual characters are in some cases.

Furthermore, it would be beneficial to provide new ways of encouraging users to purchase physical items so as to avoid situations in which a user simply borrows an item from a friend in order to gain entry into a virtual environment.

SUMMARY OF THE DISCLOSURE

In an aspect, a system for game play is provided and includes a plurality of toy construction elements and a computer system. At least some of the toy construction elements include a first connector and a second connector. The computer system is connected to receive identification data relating to physical constructions made from at least two of the toy construction elements. For a first physical construction made from a first plurality of toy construction elements, the computer system is programmed to generate a virtual representation of a first character based on the first physical construction, and to generate a first set of properties for the virtual representation of the first character based on each of the toy construction elements in the first physical construction. For a second physical construction made from a second plurality of toy construction elements that is larger in number than the first plurality of construction elements, the computer system is programmed to generate a virtual representation of a second character based on the second physical construction, and to generate a second set of properties for the virtual representation of the second character based on each of the toy construction elements in the second physical construction. The computer system is programmed to receive commands to operate whichever virtual representation is generated, in a virtual environment.

In another aspect, a method of generating virtual representations is provided. The method comprises:
  a) receiving first image data relating to a physical example of the product, wherein the product is made from a plurality of toy construction elements including at least one product identifier construction element and at least one secondary construction element, wherein the at least one product identifier construction element has a first orientation and a first position;
  b) determining what the product is from a set of possible products, based on at least one of the first orientation of the at least one product identifier construction element; and the first position of the at least one product identifier construction element, and not based on the orientation of the at least one secondary construction element, and not based on the position of the at least one secondary construction element; and
  c) generating a virtual representation of the product based on the determination in step b).

In another aspect, a method of encouraging ownership of a physical example of a character is provided, comprising:
  a) receiving first image data relating to the physical example of the product;
  b) generating a virtual representation of the character based on the first image data;
  c) providing a virtual environment in which the virtual representation of the character is operable;
  d) requesting second image data relating to the physical example of the character;
  e) receiving the second image data;
  f) assessing whether the second image data and the first image data relate to the same product; and
  g) permitting further operation of the virtual representation of the character based on the result of step f).

BRIEF DESCRIPTIONS OF THE DRAWINGS

For a better understanding of the various embodiments described herein and to show more clearly how they may be carried into effect, reference will now be made, by way of example only, to the accompanying drawings in which:

FIG. 9B is a perspective exploded view of the tool and the construction element that the tool connects to;

DETAILED DESCRIPTION

Figures 1, 1A, 1B:
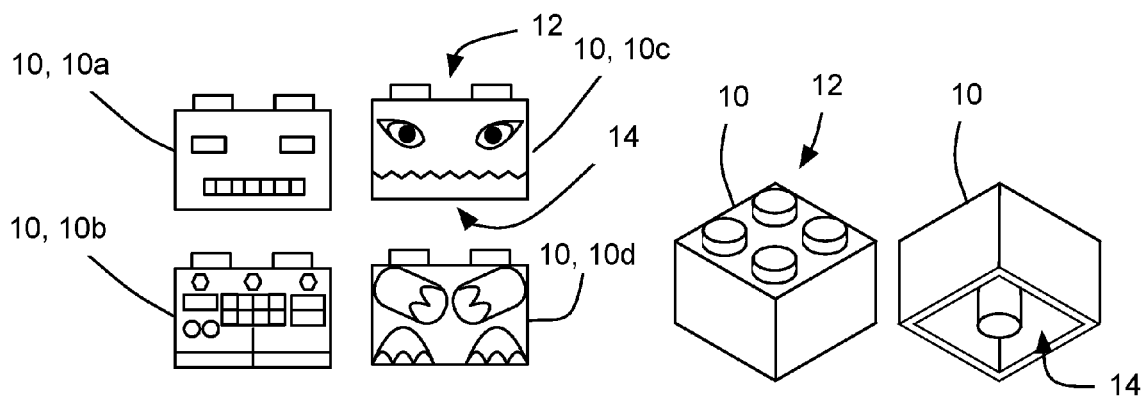
FIG. 1 is an elevation view of a plurality of toy construction elements, according to non-limiting embodiments.
FIG. 1A is a perspective view of one of the toy construction elements shown in FIG. 1.
FIG. 1B is another perspective view of one of the toy construction elements shown in FIG. 1.
Figure 2:
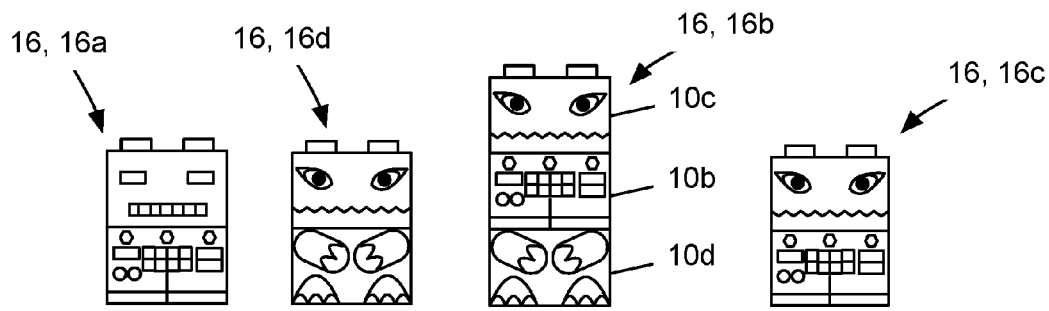
FIG. 2 is an elevation view of a plurality of physical constructions that can be made with the toy construction elements shown in FIG. 1.

Reference is made to FIG. 1 which shows a set of toy construction elements 10 that can be used to build physical constructions 16, examples of which are shown at 16a, 16b, 16c and 16d in FIG. 2.

The toy construction elements 10 may each represent a body part of a character and may have an associated theme. As can be seen in FIG. 1, the elements shown at 10a and 10b have a robot theme and represent a robot head and robot body respectively, while the elements shown at 10c and 10d have a fanciful dinosaur theme and may represent a dinosaur head and dinosaur body respectively. The toy construction elements 10a and 10b can be connected together to form a first physical construction that is a physical example of a first character shown at 16a in FIG. 2 (which is a robot character). Elements 10b, 10c and 10d can be connected together to form a physical construction shown at 16b that contains an element 10 having a robot theme and two elements 10 having a fanciful dinosaur theme. The physical construction 16b, is a physical example of a second character that is a hybrid character, since the construction 16b includes elements 10 having different themes. In the example shown the construction 16b includes an element 10 having the robot theme and two elements 10 having the fanciful dinosaur theme.

In another example, the physical constructions shown at 16c is a physical example of a hybrid character, containing an element 10 having a robot theme and one element 10 having a fanciful dinosaur theme. In yet another example, the construction 16d is a physical example of another character that is not a hybrid character, e.g. the fanciful dinosaur character.

To connect the toy construction elements 10 together, each element 10 may include a first connector 12 and a second connector 14, examples of which are shown in FIGS. 1A and 1B respectively. The connectors 12 and 14 permit the elements 10 to be releasably connected together to form the physical constructions 16. As shown in FIG. 1A, the first connector 12 may include a plurality of cylindrical studs. As shown in FIG. 1B, the second connector 14 may include a recess configured to snugly receive the studs. The examples of first and second connectors 12 and 14 shown in FIGS. 1A and 1B are well known in the art of construction toys. However, any other suitable examples may be used.

As can be seen, by providing at least some of the elements 10 with two connectors, one can form physical constructions that comprise three or more elements 10, as shown in the example physical construction 16b, which is made from elements 10b, 10c and 10d.

Figure 3:
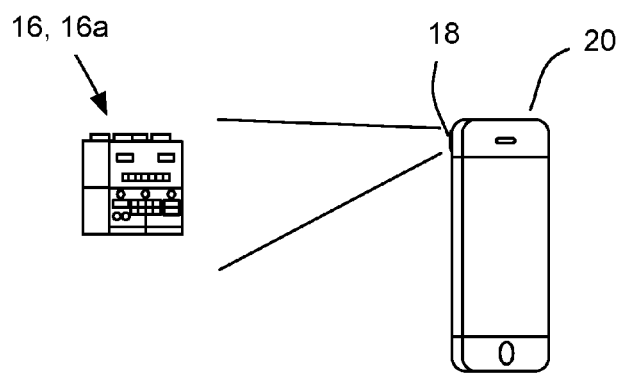
FIG. 3 is a perspective view illustrating obtaining image data of one of the physical constructions shown in FIG. 2.
Figure 4:
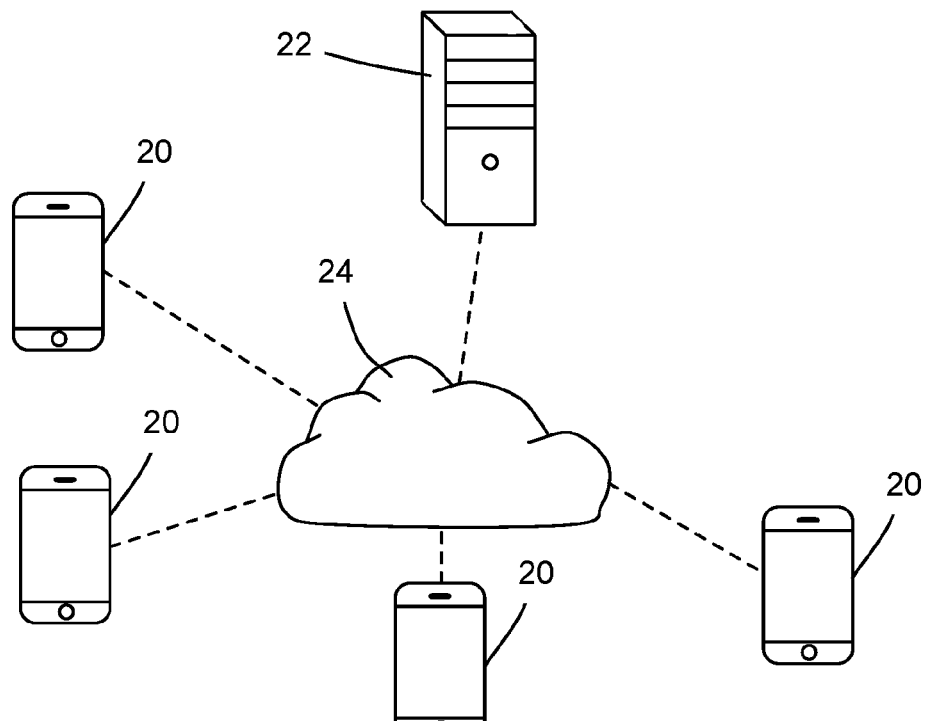
FIG. 4 is a schematic illustration showing a computer system to which the image data can be uploaded by a user through a network.
Figure 5:
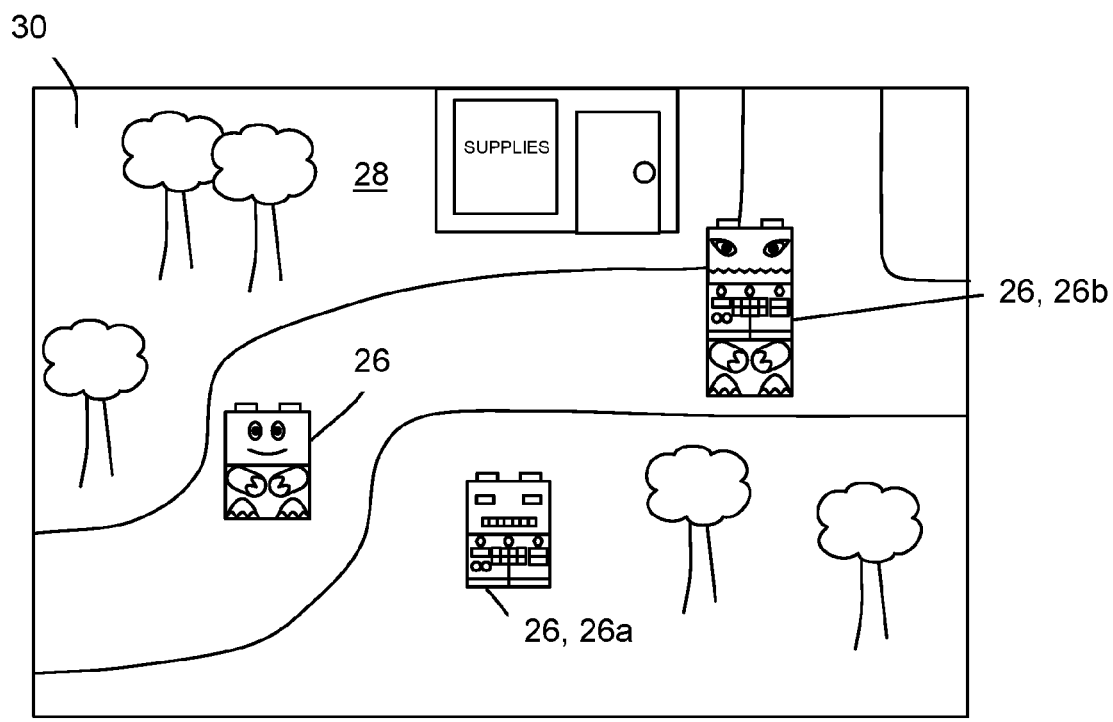
FIG. 5 is an illustration of a virtual environment containing virtual representations of characters generated by the computer system based on physical constructions made by one or more users.
Figure 6:
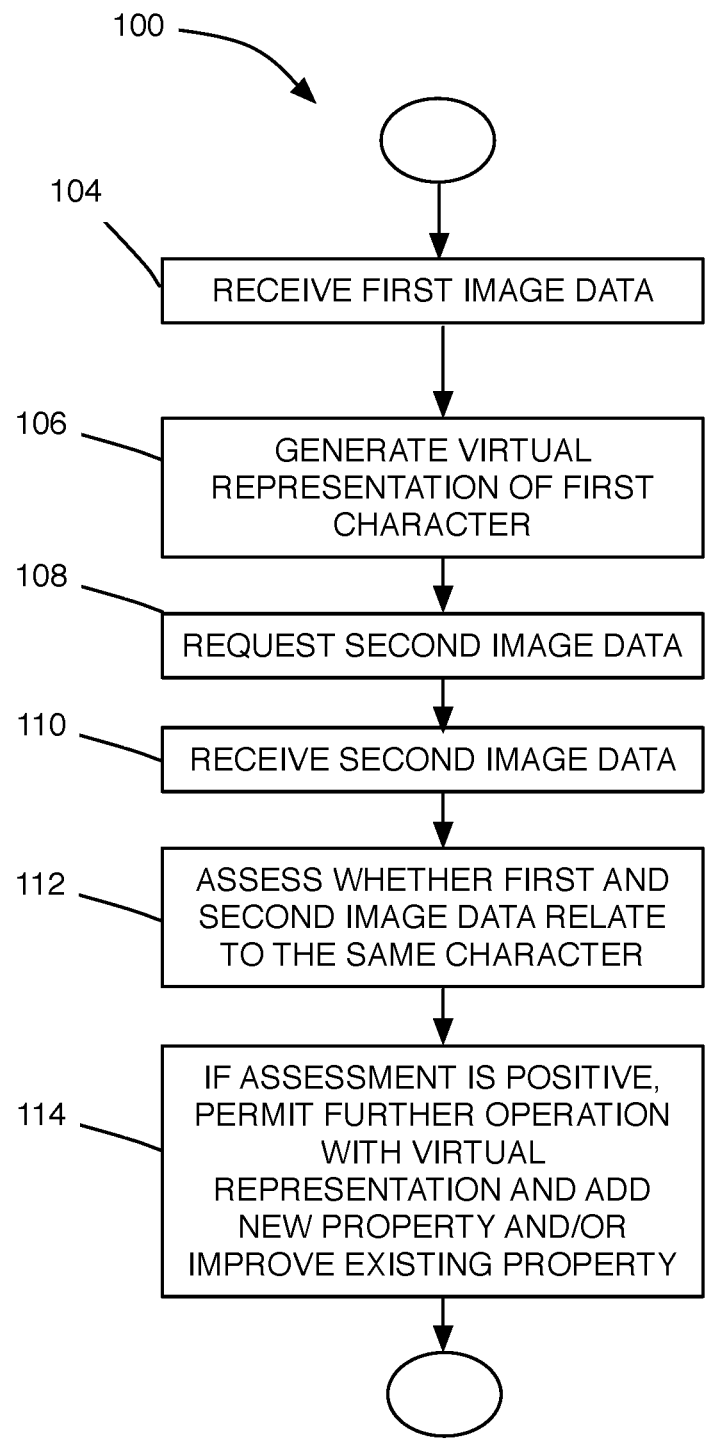
FIG. 6 is a flow diagram illustrating a method of generating virtual representations, according to another embodiment.

Game play with a physical construction 16 may take place according to a method shown at 100 in FIG. 6, with additional reference to FIGS. 3-5. Initially, image data is obtained from a physical example of the character. In the example shown in FIG. 3, the physical example is the physical construction 16a. The image data may be any suitable image data, such as, for example, a frontal image of the construction 16 taken from a camera (shown at 18) on a device, such as a smartphone, shown at 20. At step 104 the image data is received by a computer system. The computer system is shown at 22 in FIG. 4. The image data can be uploaded to the computer system 22 by a user of the construction 16 via a suitable type of connection shown at 24. For example, the image data may be uploaded via the internet in embodiments wherein the computer system 22 is remote from the user. In other examples, the image data may be uploaded via a LAN or via a hard-wired connection between the device 20 and the computer system 22. In the example shown in FIG. 4, a plurality of devices 20 are connected to the computer system 22 and may upload image data to the computer system relating to a plurality of physical examples of characters by a plurality of different users.

At step 106 in FIG. 6, a virtual representation of the character (e.g. the robot character) is generated based on the image data. Virtual representations (including one of the robot character) are shown at 26 in FIG. 5. A virtual environment (shown at 28 in FIG. 5) is provided by the computer system 22. The virtual environment may be displayed on a display 30 on the user's device 20 directly, or on any other suitable device, such as a user-accessible computer that is separate from the device 20. In the example shown in FIG. 5, three users each have a different virtual representation 26 in the virtual environment 28.

The virtual representations 26 are operable by their associated user in the virtual environment. In other words, the computer system 22 may be programmed to receive commands to operate whichever virtual representations 26 are generated, in the virtual environment 28.

The computer system 22 may be programmed to generate a first set of properties for each virtual representation 26, based on each of the toy construction elements in the associated physical construction 16. For the first virtual representation 26a, which is based on a first physical construction 16a, the properties may all be properties associated with a robot character. For the virtual representation 26b, which is based on the second physical construction 16b, the properties may include both properties associated with a robot character and properties associated with a fanciful dinosaur character. For greater certainty, it will be noted that the virtual properties that are generated for the virtual representation 26b are different than the virtual properties that would be generated for a virtual representation based on construction 16c. For example, the virtual properties for the virtual representation 26b may have properties that are more strongly associated with dinosaurs than the virtual properties for a virtual representation based on the construction 16c.

Periodically during game play, it may be desirable to verify whether the user is still in possession of the physical construction 16 used to generate the virtual representation of the character, in an effort to encourage ownership of the physical construction. By contrast, if all that was required to prove ownership of the physical construction was to obtain image data once, then a user could easily borrow the elements 10 from a friend and take an image at that time.

To encourage ownership of the physical construction, the computer system 22 may, at step 108, request second image data relating to the physical example of the character, and receives the second image data at step 110. At step 112, the computer system assesses whether the second image data and the first image data relate to the same character. If the assessment at step 112 is positive (i.e. if the assessment is that the first and second image data do relate to the same character), then the computer system 22 may permit further operation of the virtual representation of the character at step 114.

Figure 7:
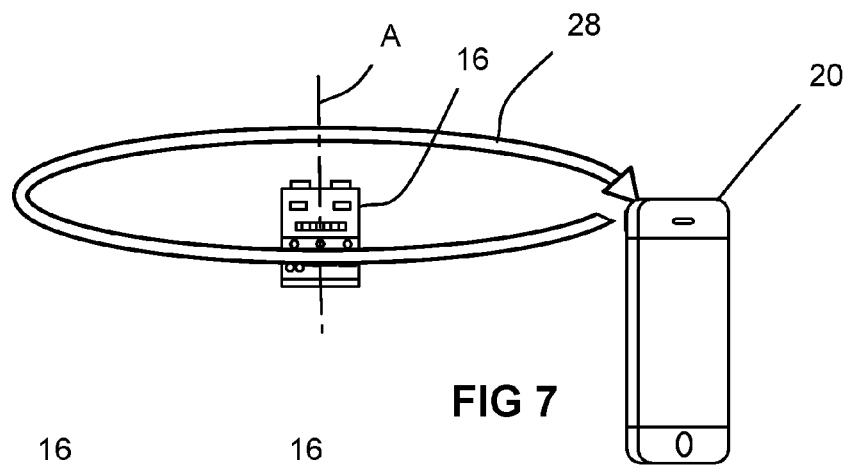
FIG. 7 is a perspective view illustrating obtaining second image data of one of the physical constructions shown in FIG. 2.

The second image data may include, for example, image data depicting substantially 360 degrees of view around the physical example 16 of the character about an axis. For example, the user may be requested to take a panorama shot of the physical example 16 of the character to capture 360 degrees of view about the physical example's central axis A, as illustrated by arrow 28 in FIG. 7. The axis may be the generally central axis A of the physical example 16.

Step 108 in FIG. 6 may take place at a selected point during game play in the virtual environment 28 (FIG. 5). For example, step 108 may take place immediately after the virtual representation 26 of the character completes a selected task in the virtual environment 28, such as defeating a villain. Step 114, in which the user is permitted to continue using the virtual representation 26 of the character in the virtual environment 28, which may include at least one of: adding a new property to the virtual representation 26 of the character (such as the ability to fly), and improving an existing property of the virtual representation of the character (such as improving the representation's health value), and may further include permitting the character to play in a new virtual environment or a new area of the existing virtual environment 28.

Figure 8:
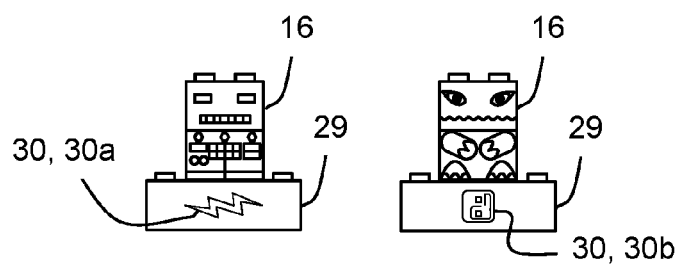
FIG. 8 is an elevation view of some physical constructions that include team identifier construction elements.
Figure 9A:
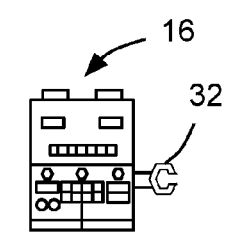
FIG. 9A is an elevation view of a physical construction that includes a tool connected to one of the toy construction elements.
Figure 9B:
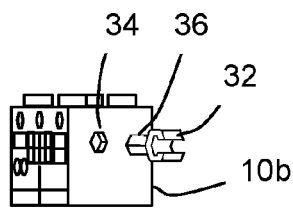

Some additional features may be provided. For example, team identifier elements 29 (FIG. 8) may be provided, which have connectors 12 and/or 14 thereon so as to permit releasable connection to the physical constructions 16. The team identifier elements have team identifier indicia 30 thereon. When a physical construction 16 is positioned on a team identifier element 29 and is photographed, the virtual representation 26 that is generated may be placed on a team with any other virtual representations generated from physical constructions on team identifier elements 29 bearing the same indicia 30. For example, with reference to FIG. 8, any virtual representations generated where the physical construction 16 is on a team identifier element 29 bearing first indicia 30a (a lightning bolt symbol) will be together on a first team, and any virtual representations generated where the physical construction 16 is on a team identifier element 29 bearing second indicia 30b (a squared yin-yang symbol) will be together on a second team. The computer system 22 may be programmed to interpret teams in any suitable way. For example, the computer system 22 may be programmed to prevent members of a team from hurting each other during battles with other teams in the virtual environment 28.

Another additional feature that may be provided relates to optional appendages with tools that are connectable to the construction elements 10 to form part of the physical constructions 16. An example is a gripper tool shown at 32 in FIGS. 8A and 8B. The gripper tool 32 is receivable in a tool-receiving aperture 34 in the construction element 10b. In the embodiment shown, the tool 32 connects to the element 10b in a plurality of selected orientations. This can be achieved in any selected way. For example, the tool 32 shown in FIG. 8b has a hex-shaped end 36 and the aperture 34 is hex-shaped. The tool 32 may give additional properties to the virtual representation of the character that is generated when the physical construction is scanned in. Furthermore, in embodiments wherein the tool 32 is positionable in selected orientations the tool may be represented in the virtual environment 28 differently, depending on its orientation. For example if the gripper tool 32 is oriented a certain way on the physical construction 16, it may be capable of picking things up off the ground in the virtual environment, but if the gripper tool 32 is oriented a different way on the physical construction the virtual representation of the gripper tool 32 may be capable of holding a virtual gun in the virtual environment.

Figure 10A:
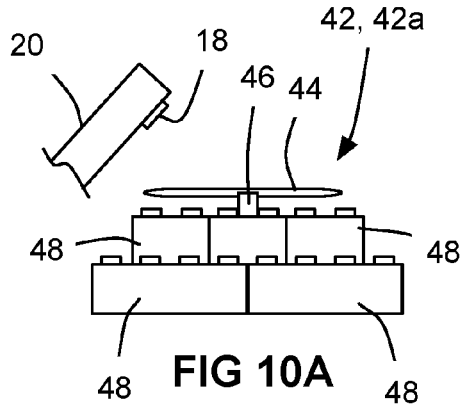
FIGS. 10A and 10B are elevation views of physical constructions that represent two products and that each incorporate a plurality of product identifier construction elements and secondary construction elements.
Figure 10B:
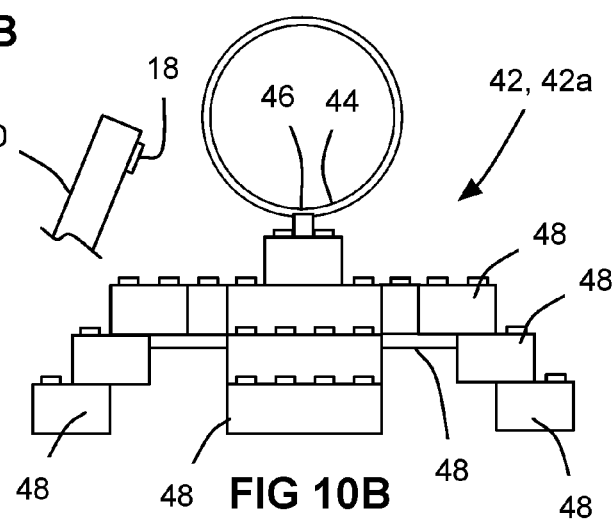
Figure 11:
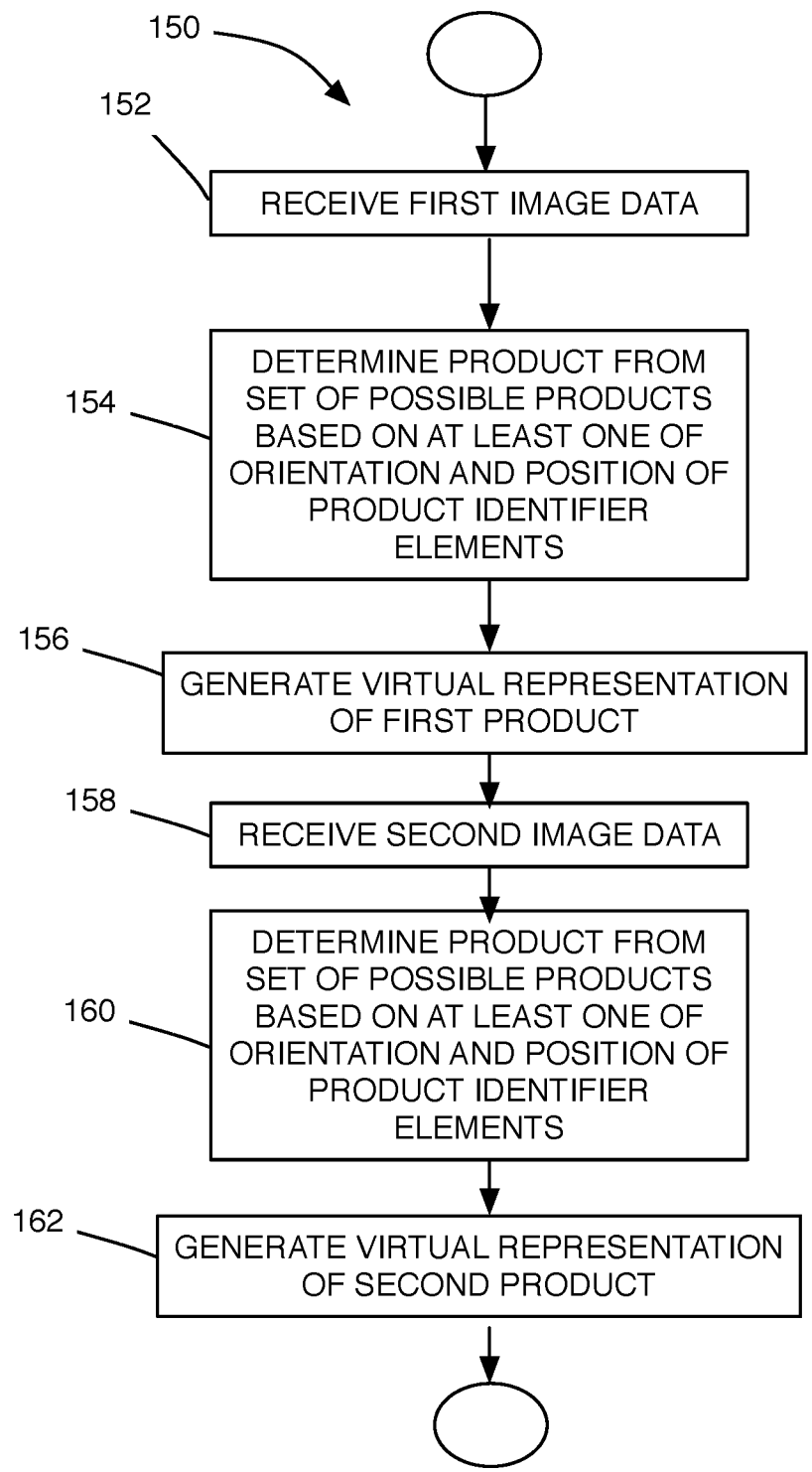
FIG. 11 is a flow diagram illustrating a method of encouraging ownership of a physical example of a character, according to another embodiment.

Another optional feature is illustrated in FIGS. 10A and 10B. As can be seen, toy construction elements 40 can be provided that are used to build physical constructions 42 that are physical examples of a product instead of being a physical example of a character. In FIG. 10A, a first physical construction 42a is shown which is a physical example of a time machine platform. In FIG. 10B, a second physical construction 42b is shown, which is a physical example of a teleportation portal. The physical constructions 42a and 42b both include at least one product identifier construction element (in this case they each include first and second product identifier elements 44 and 46, which are a ring and a ring holder respectively), and they both further include at least one secondary construction element 48 (in this case they each include a plurality of secondary construction elements). In the first physical construction 42a, the product identifier construction elements 44 and 46 have a first orientation and a first position. In the second physical construction 42a, the product identifier construction elements have a second orientation and a second position. In the example shown in FIGS. 10A and 10B, the element 46 has the same position and orientation in both physical constructions 42a and 42b, but the element 44 has a different orientation in the construction 42b than it does in the construction 42a. To get a physical construction represented in the virtual environment, a method (illustrated at 150 in FIG. 11) as follows may be carried out. The user may use their smart device 20 to obtain image data (e.g. using a camera 18 on a smartphone 20). The computer system 22 may then receive first image data relating to a physical example of the product. For example, the computer system 22 may receive at step 152 (FIG. 11) first image data relating to a first physical construction (e.g. construction 42a) that is a physical example of a first product. At step 154, the computer system 22 (FIG. 4) determines what the product is from a set of possible products, based on at least one of the orientation of the at least one product identifier construction element; and the position of the at least one product identifier construction element, and not based on the orientation of the at least one secondary construction element, and not based on the position of the at least one secondary construction element. The secondary construction elements 48 may include more than one type of construction element and are used to complete the construction 42 but are not needed by the computer system 22 to determine the type of product being represented. At step 156, the computer system 22 generates a virtual representation of the first product (i.e. the time machine platform) based on the determination in step 154. The virtual time machine platform may, for example, be used in the virtual environment 28 to transport a virtual representation of a character 26 to another virtual environment representing a different time period in history.

At some point during game play, the user may disassemble the construction 42a and build the physical construction 42b which represents the teleportation portal. The user may then take another image (which may be referred to as second image data) using their smartphone 20 and may upload it to the computer system 22 (FIG. 4), so that the computer system 22 receives the second image data at step 158 in FIG. 11. At step 160, the computer system 22 (FIG. 4) determines what the second product is from a set of possible products, based on at least one of the second orientation of the at least one product identifier construction element; and the second position of the at least one product identifier construction element, and not based on the orientation of the at least one secondary construction element, and not based on the position of the at least one secondary construction element. At least one of the second position and the second orientation of the product identifier elements 44 and 46 is different than the first position and first orientation respectively of the product identifier elements 44 and 46. At step 162, the computer system 22 generates a virtual representation of the second product based on the determination in step 160. The virtual representation of the second product may replace the virtual representation of the first product generated at step 156. Alternatively, the virtual representation of the second product may be generated in addition to the virtual representation of the first product generated at step 156.

The computer system 22 shown in FIG. 4 is shown as being a single unit, however it will be understood that it could be a distributed system comprising many individual computers that are spaced apart from one another geographically.

The image data described in the embodiments above it just one example of identification data that can be received by the computer system 22 to identify the product or character being represented by the physical constructions built by a user. Another type of identification data that could be used in at least some embodiments may include alphanumeric codes that may be entered manually by a user into device 20 and uploaded to the computer system 22, wherein each code identifies a particular construction element.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A method of generating virtual characters, comprising:
   a) receiving, via a processor executing a virtual character generation program stored in storage of a computer system, first image data from an imaging device comprising at least one image of a physical character constructed of at least two toy construction elements, each having at least one product identifier visibly displayed thereon;
   b) comparing the image data to a set of product identifier data storage in the storage to identify at least two product identifiers in the received image data;
   c) determining a set of properties for a virtual character corresponding to the at least two product identifiers;
   d) generating a virtual character having the determined set of properties; and
   e) executing a virtual environment in which the virtual character operates; and
   f) presenting the virtual character in the virtual environment on a display coupled to the processor.

2. A method as claimed in claim 1, wherein the first image data is an image.

3. A computer system for game play, comprising:
   a display;
   an imaging device;
   storage storing a set of product identifier data, and a virtual character generation program; and
   a processor that, when executing the virtual character generation program:
      receives image data from the imaging device, the image data comprising at least one image of a physical character constructed of at least two toy construction elements, each having a product identifier visibly displayed thereon;
      compares the image data to the set of product identifier data to identify at least two product identifiers in the received image data;
      determines a set of properties for a virtual character corresponding to the at least two product identifiers;
      generates the virtual character having the determined set of properties;
      executes a virtual environment in which the virtual character operates; and
      presents the virtual character in the virtual environment on the display.

4. A computer system as claimed in claim 3, wherein the toy construction elements represent body parts of the characters, and wherein the processor, when executing the virtual character generation program, compares the imaging data to the set of product identifier data to identify at least one of a plurality of tools that are connectable to the toy construction elements, and generates virtual tools for the virtual characters based on the presence of the at least one tool in the physical character.

5. A method as claimed in claim 3, wherein the determining the set of properties comprises determining a combined effect for the at least two product identifiers that is other than additive.

6. A method as claimed in claim 4, further comprising:
   g) terminating the presentation of the virtual character in the virtual environment on the display until second image data from the imaging device including the at least two product identifiers is received.

7. A method as claimed in claim 6, wherein the second image data comprises at least one image of the physical character that differs from the first image data.

8. A method as claimed in claim 7, wherein the second image data comprises at least one image of the physical character in a different pose than in the first image data.

9. A method as claimed in claim 8, wherein the at least one image of the second image data show a substantially 360 degree view of the physical character about an axis.

* * * * *

UNITED STATES PATENT AND TRADEMARK OFFICE
CERTIFICATE OF CORRECTION

PATENT NO. : 9,901,827 B2
APPLICATION NO. : 14/988836
DATED : February 27, 2018
INVENTOR(S) : Timothy Robert May It is certified that error appears in the above-identified patent and that said Letters Patent is hereby corrected as shown below:

Column 8, Line 45 Claim 6 should read:
6. A method as claimed in claim 1, further comprising:
    g) terminating the presentation of the virtual character in the virtual environment on the display until second image data from the imaging device including the at least two product identifiers is received.

Signed and Sealed this
First Day of May, 2018

Andrei Iancu
*Director of the United States Patent and Trademark Office*